(12) United States Patent
Zickell

(10) Patent No.: US 6,296,912 B1
(45) Date of Patent: Oct. 2, 2001

(54) ROOFING MATERIAL WITH FIBROUS MAT

(75) Inventor: Thomas Zickell, Stratham, NH (US)

(73) Assignee: Northern Elastomeric, Inc., Brentwood, MT (US)

( * ) Notice: Subject to any disclaimer, the term of this patent is extended or adjusted under 35 U.S.C. 154(b) by 0 days.

(21) Appl. No.: 09/106,241

(22) Filed: Jun. 29, 1998

(51) Int. Cl.$^7$ ................................. B32B 7/04; E04D 5/02
(52) U.S. Cl. .................. 428/40.1; 428/40.3; 428/41.7; 428/41.8; 428/67; 428/141; 428/196; 52/177; 52/180; 52/181; 52/309.1; 52/DIG. 16
(58) Field of Search ..................... 428/40.1, 40.3, 428/41.7, 41.8, 67, 141, 142, 196, 489; 52/177, 180, 181, 309.1, 309.13, 408, 411, 783.1, 746.11, DIG. 16

(56) References Cited

U.S. PATENT DOCUMENTS

| | | | |
|---|---|---|---|
| 4,039,706 | * 8/1977 | Tajima et al. | 428/40.3 |
| 4,342,804 | * 8/1982 | Meynard | 428/149 |
| 4,670,071 | * 6/1987 | Cooper et al. | 156/71 |
| 5,055,135 | * 10/1991 | Grube et al. | 106/281.1 |
| 5,171,629 | * 12/1992 | Heidel et al. | 442/383 |
| 5,308,676 | * 5/1994 | Gelles et al. | 428/141 |
| 5,380,773 | * 1/1995 | Bellio et al. | 524/68 |
| 5,687,517 | * 11/1997 | Wiercinski et al. | 52/177 |
| 5,787,677 | * 8/1998 | Bolich et al. | 52/784.15 |

* cited by examiner

Primary Examiner—Harold Pyon
Assistant Examiner—Elena Tsoy
(74) Attorney, Agent, or Firm—Bourgue & Associates, PA

(57) ABSTRACT

A roofing membrane material is disclosed. The material is characterized in that it includes a woven or non-woven fibrous mat having an adhesive asphalt coating, such as a two-layer asphaltic coating applied to one surface thereof. The asphaltic coating can be a first relatively non-adhesive asphaltic material that infiltrates a portion of the fibrous mat and a second, relatively adhesive asphaltic material deposited upon an exposed surface of its non-adhesive counterpart.

16 Claims, 9 Drawing Sheets

ROOFING MATERIAL WITH FIBROUS MAT

FIELD OF THE INVENTION

The present invention is in the field of roofing materials. More particularly, the present invention is in the field of roofing membrane materials having a fibrous mat on one surface to provide traction to roofing installers during construction of the roof.

BACKGROUND OF THE INVENTION

Asphalt based roofing shingles are presently installed on approximately eighty percent of the homes in the United States. In areas where snow accumulates, roof shingles can develop leaks as a result of ice dams which can form along the eaves of a roof. Ice dams form as the result of a differential temperature which occurs between the eaves of the roof and the interior sections of the roof. The temperature differential occurs when heat rises into the attic space. Under certain temperature conditions, snow collected on the roof surface will melt along the upper interior portions of the roof and then freeze when the liquid snow-melt reaches the cooler eave section of the roof. As can be seen in FIG. 1, the result is that a pool 1 of liquid water can form between the roof surface 2 and the ice dam 3. The ice dam 3 prevents the water from reaching the gutter 4 and draining away. Ultimately, the liquid water 1 can leak 5 through the roof surface 2, causing interior water damage to the structure. Ice dams can also occur as a result of frozen slush accumulating in gutters, also causing liquid to collect and leak through the roof.

In a typical roofing installation using asphalt shingles, an underlayer is first applied to the plywood deck of the roof. The underlayer may take the form of an asphalt saturated paper which is useful as a waterproofing member. Roofing shingles are applied on top of the underlayer with the seams of adjacent rows positioned in an offset relationship. In practice, a starter row or strip is begun at the roof eaves using self-sealing shingles. The end of the first shingle in the strip is trimmed such that, when it is placed on the deck, the cutouts of the first course of shingles will not be placed over the starter strip joints. The starter strip and the shingles are nailed to the eaves. Successive rows of shingles are then secured to the deck or roof using nails.

To ensure maximum protection against ice dams, membranes or metal flashing is installed wherever there is a possibility of icing, such as along the eaves of the roof. As noted above, ice dams are formed by the continual thawing and freezing of melting snow, or the backing up of frozen slush in gutters, which force water under the roofing, thereby causing damage to a structure's ceilings, walls, and insulation. The ice damming problem is most acute on low-slope roofs; that is, roofs with a slope of two inches (5.08 cm) to four inches (10.16 cm) per foot (30.48 cm).

Traditional eaves flashing has either been 50-pound coated felt or two layers of 15-pound saturated felt cemented together. The term "pound" is defined as the weight of the felt required to cover an area of 108 square feet. Typically, the asphalt used in the fifty-pound felt is not modified with rubber, and after aging, will not form a good seal around nails. Additionally, the installation of two layers of 15-pound saturated felt consumes undesirable amounts of time and also will not seal around nails.

The use of self-adhesive products, such as ice and water protective membranes, has now become commonplace. A major problem with these products is that they are slippery, especially when wet or covered with frost. Slippery surfaces upon roofs create significant safety hazards for roofing installers, especially since such surfaces tend to be at least one story above ground level.

In an attempt to reduce the slippery nature of ice and water protective membranes, separate methods have been developed. In the first method, granules have been embedded in an asphaltic composition or in polyethylene sheeting which is either embossed or coated. When positioned on an upper surface of the membrane, the granules provide a high-traction surface upon which a roofing installer can walk. Such membranes also offer reinforcement and/or structural integrity, and allow lap sealing. Unfortunately, the granular surfaced materials suffer from disadvantages in that the granules cannot all be embedded into the asphalt material, thereby providing some degree of loose granules which can render the surface slippery. Additionally, since the granules roughen the membrane surface, it becomes necessary to cement overlaps in order to render them watertight. Finally, the granules add weight to the membrane which increases handling difficulties and freight costs associated with the membranes.

As for the membranes which employ polyethylene sheeting, the polyethylene surface tends to be quite slippery, thereby raising safety concerns. Furthermore, membranes which use polyethylene sheeting tend to be very flexible, rendering them hard to handle and apply.

Thus, a need exists for a membrane material which provides a highly non-slip surface, excellent lap sealing, structural integrity and lower weight.

SUMMARY OF THE INVENTION

The present invention relates to roofing membrane materials having a fibrous mat surface which provides traction, structural integrity and lap sealing capabilities. More particularly, the present invention relates to a roofing membrane material having a woven or non-woven fibrous mat and a rubberized asphalt layer. In one preferred embodiment, the rubberized asphalt layer is a two-layer composition constructed of a first, relatively non-adhesive asphaltic coating on one surface of the mat which infiltrates partially, but not completely through the mat, and a second, relatively adhesive asphaltic layer on the exposed surface of the first asphaltic layer. The portion of the second asphaltic layer which is exposed is very adherent, and provides excellent adhesion of the membrane to a roof deck.

For preventing multiple layers of the membrane from adhering to one another during shipping and storage, a release sheet can be applied to the lower, adherent surface of the rubberized asphalt layer. As a result of the release sheet, when the membrane is rolled, or when several layers of the membrane are stacked together, the release sheet is interposed between the sticky lower surface of the rubberized asphalt and the adjacent traction layer. By interposing the release sheet, adhesion between subsequent layers of the membrane material is prevented. Of course, during application to a roof surface, the release sheet is removed, thereby allowing the sticky underside of the membrane to adhere to the roof.

One object of the present invention is to provide rubberized asphalt roofing product which can be applied along the eaves of a roof to serve as a water infiltration barrier for the overlying shingles.

Another object of the present invention is to provide a roofing membrane having a non-slip surface for the safety of roof installers.

These, and additional features and advantages of present invention, will become more apparent from the following detailed description when taken in conjunction with the accompanying drawings.

DETAILED DESCRIPTION

Figure 1:
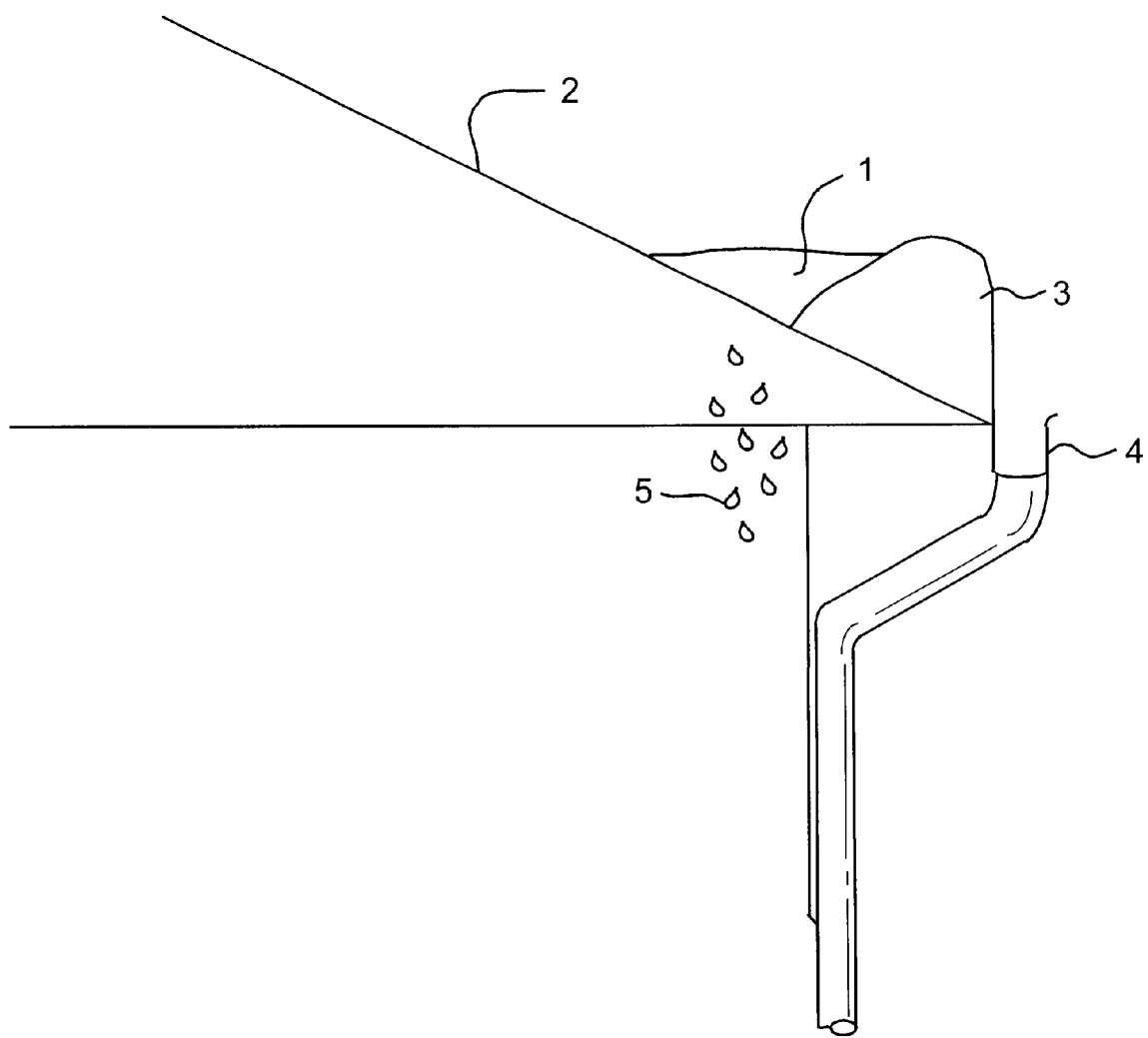
FIG. 1 is a side elevational view of a portion of a roof showing an ice dam.

The present invention relates to self-adhesive membranes which have been developed to eliminate problems associated with ice dams. The inventive membranes have a woven or non-woven fibrous mat which supports two-layer, rubberized asphalt that adheres directly to the wood deck of a roof. Roof shingles may then be applied directly over the membrane. The membrane prevents water entry into the structure by adhering to the deck and sealing around the nails which are used to hold the shingles to the roof deck. The rubberized asphalt layer includes a first, relatively non-adherent asphaltic material which is positioned on a lower surface of the fibrous mat and infiltrates a portion thereof. The rubberized asphalt layer also includes a second, adherent asphaltic material, positioned below the first, relatively non-adherent material. The adherent material serves to affix the membrane to the roof deck.

As noted previously, two types of self-adhesive membranes are currently used to solve the ice dam problem: granular surfaced membranes and polyethylene surfaced membranes. Typical polyethylene surfaced products are either embossed or coated to reduce the slip hazard to the roofing installer. Since the roofing installer must stand on the membrane during its application to the roof deck, surface traction on the membrane is a significant safety issue. The present invention increases surface traction on the membrane by providing a high-traction fibrous mat on the upper surface of the membrane. The mat may be high traction by its own nature, or it may be provided with a non-slip coating embedded at least on its surface.

The fibrous mat may be any of a wide variety of woven or non-woven material. In one preferred embodiment, the fibrous mat comprises a non-woven fiberglass mat. The mat is preferably saturated with a polymeric material which serves several purposes. Specifically, the polymer tends to fill in gaps and porous regions in the mat, thereby acting as a barrier to prevent the adjacent, relatively non-adhesive asphaltic material, from penetrating the mat when weight is applied thereto, particularly on hot days. The polymer also serves to fill gaps in the mat through which leaks could otherwise occur in section of the membrane which are lapped. Furthermore, the polymer provides or enhances a high traction walking surface.

In addition, the polymer acts as a binder to strengthen the membrane. Polymeric strengthening of the membrane is desired because the membrane must meet an ASTM tensile strength requirement of 24 pounds per inch. The strength of the polymer thereby allows a lighter glass mat to be used.

Finally, the polymer acts to bind loose glass fibers. This is important for several reasons. If the membrane were made without a separate polymeric coating, the exposed, loose glass fibers could cause skin irritations and itching for the roofing installers. Additionally, by binding loose fibers, the polymer also increases traction on the surface of the fibrous mat. Although glass fibers are very rough, they can be dislodged by foot traffic. The polymer holds the fibers in place without completely filling in the irregularities and a high-traction surface results, both from the fiber binding properties of the polymer and its inherent high-traction properties.

When using a fiberglass mat, a non-woven fiberglass weighing between one to three pounds per hundred square feet (about 0.05–0.15 kg/m$^2$), preferably about two pounds per hundred square feet (about 0.10 kg/m$^2$), is used. The polymer that is applied to the mat can be selected from any of a wide variety of polymeric materials. For example, polyurethanes, polyethylenes, latex, ethylene vinyl acetate (EVA), acrylic polymers and polyesters all may be used. In one preferred embodiment, the polymer comprises a UV curable polyurethane. In another preferred embodiment, the non-woven fiberglass mat is provided with a coating of polyethylene.

It should be noted, however, that the invention is not intended to be limited to polymeric coated fiberglass mats. Rather, any of a wide variety of fibrous mat materials, including, but not limited to, woven and non-woven polyesters and polypropylenes, with or without polymeric coatings, may be used. For example, in one preferred embodiment, the mat comprises a non-woven polyester, preferably weighing between about 2.22 to about 4.88 pounds per hundred square feet, (about 0.11–0.24 kg/m$^2$). In that embodiment, a separate polymeric coating is not used, although, optionally, it may be.

In a broad sense, the present invention comprises a roofing membrane material having a traction layer formed by the fibrous mat and an adhesive asphalt coating, such as the two layer asphaltic coating described herein. The two layer asphaltic coating includes a first, relatively non-adhesive layer and a second, relatively adhesive layer. The first, relatively non-adhesive layer, in one preferred embodiment, comprises an oxidized asphalt and limestone filler. These two components may be present over a wide compositional range, but a ratio of 50% by weight of each is preferred. The mixture of oxidized asphalt and limestone filler is desirable in that it is relatively inexpensive, has excellent high temperature stability due to its Ring and Ball melt point of about 225–250° F. (about 107–121° C.), and helps to create a non-stick, but safe walking surface. This is important because, especially in the case of EVA-coated fiberglass, gaps in the mat may be present. Using a method that will be described in detail below, the first, relatively non-adhesive asphaltic layer is applied to the fibrous mat in a manner such that it infiltrates through a portion of the mat's thickness. Thus, the mat will have an upper portion that does not contain the non-adhesive asphaltic layer as well as a second, lower portion that will be infiltrated, and preferably saturated with the non-adhesive asphaltic material.

The second portion of the two layer asphaltic coating is a relatively adhesive layer that is formed on the surface of the non-adhesive asphaltic layer that is not in contact with the fibrous mat. This second, adhesive layer generally comprises a material having from about 0–30% mineral stabilizer, (i.e., powdered limestone), about 5–15% styrene-butadiene copolymer or styrene-butadiene-styrene copolymer, and the balance being flux asphalt having a Ring and Ball softening point of between about 80° F. and about 150° F., (i.e., between about 26.67° C. and about 65.56° C.). Additionally, a tackifying oil, such as Hydrolene may be added.

This second layer of material, being adhesive, is used to adhere the membrane to the roof deck. By using the double layer of asphaltic material, however, the first, relatively non-adhesive layer provides thermal stability to the second, adhesive layer without reducing the effectiveness of the adhesive material.

A release sheet, as described below, can be adhered to the adhesive material to protect the adhesive properties during transport and storage of the membrane.

Figure 2:
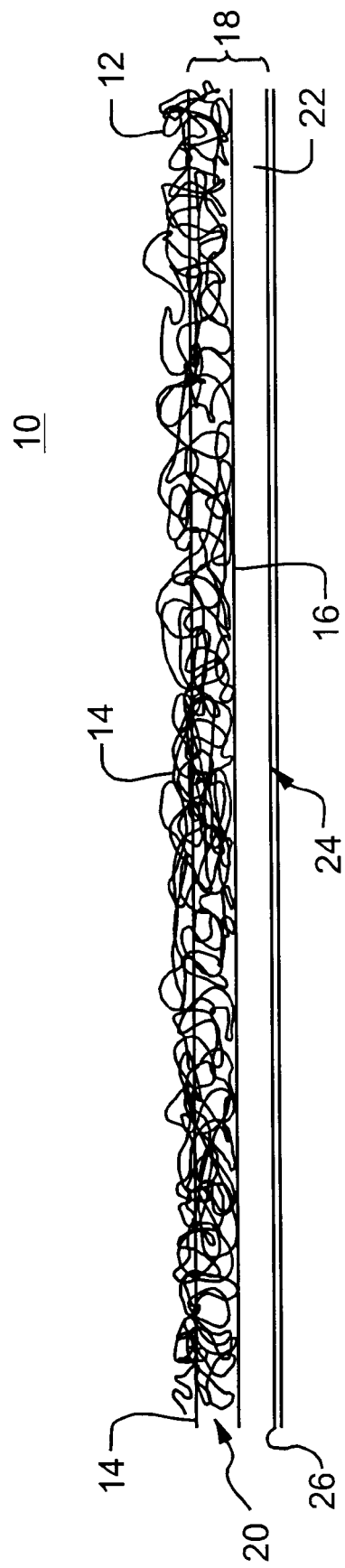
FIG. 2 is a sectional view of the roofing membrane of the present invention.

FIG. 2 depicts a roofing membrane material 10 of the present invention. More particularly, as can be seen in FIG. 2, the roofing membrane material 10 comprises a multilayered structure formed of a fibrous mat 12, having upper 14 and lower 16 surfaces, and a double asphaltic layer 18 disposed on the lower surface 16 of the fibrous mat 12. The double asphaltic layer 18 comprises a first relatively non-adhesive portion 20 and a second, relatively adhesive portion 22.

Optionally, a release sheet 24, such as a paper or plastic film having a siliconized surface 26 can be adhered to the relatively adhesive portion 22 of the double asphaltic layer 18. The release sheet 24 is removed prior to use of the membrane material to allow the adhesive portion 22 of the double asphaltic layer 18 to be adhered to a roof surface. The release layer 24 is typically a paper sheet having a siliconized surface 26. As an alternative, the release layer can comprise two separate sheets; a first supporting sheet of a paper or polymeric film, and a second sheet of a low surface energy material. Additionally, in the case of a siliconized paper, the silicon coating may be replaced by some other suitable low surface energy material such as a wax emulsion or a soap solution.

As can also been seen in FIG. 2, the invention is characterized in that the first relatively non-adhesive portion 20 of the double asphaltic layer 18 infiltrates into a portion of the fibrous mat 12, however, it does not extend completely through the mat. In so doing, the relatively non-adhesive portion 20, serves to seal the mat 12, without detracting from the mat's particular non-slip properties. As noted previously, and especially when formed from fiberglass, a polymeric coating may be applied to the mat to further seal it and to enhance its non-slip characteristics.

The above-described structure addresses many of the needs currently embodied in the roofing industry. For example, the double asphaltic layer 18 provides a good seal between the membrane and the roof surface to prevent moisture from penetrating into the roof, even if ice dams are formed on the eaves of the roof. The double asphaltic layer 18 also elongates and recovers around the nails, thereby providing an excellent seal around nails that pass through the material to secure shingles to the roof surface. In addition, the fibrous mat 12 serves to provide a non-slip surface to the portion of the membrane material 10 that will be walked upon by roofing installers. This non-slip surface offers the installers greater traction, and thus, greater safety, when installing the roof, even in wet or otherwise slippery conditions.

As for thermal considerations, many roofing applications require a material that will resist flowing even at temperatures as high as 225° F. (about 107° C.). In the present membrane, however, the double asphaltic layer and the open fibrous surface of the fibrous mat produce a membrane that will resist flow even at temperatures above about 250° F. (about 121° C.). This result occurs, in part, because the fibrous nature of the mat has a tendency to wick and capture any material that begins to flow as the roof temperatures exceed the melting point of the asphaltic materials.

Figure 3:
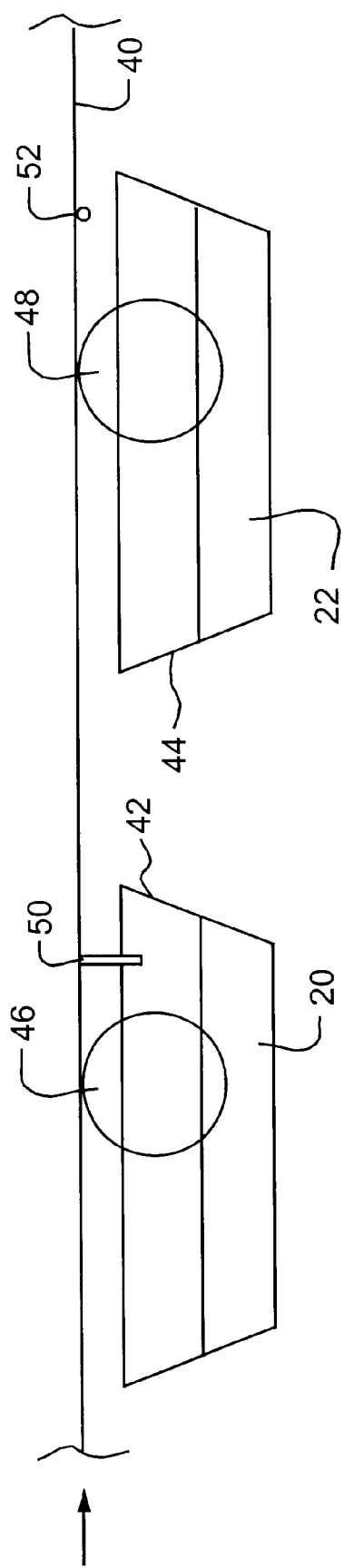
FIG. 3 is a schematic representation of one process for providing a fibrous web with a double layer asphaltic coating.

Membranes of the present invention are made using a continuous, multi-coating process. One embodiment of the process is shown in FIG. 3. In FIG. 3, a web 40 of the fibrous material is continuous moved over two coating bath tanks 42, 44. The first coating bath the first coating bath tank 42 contains a liquid batch of the first, relatively non-adhesive asphaltic layer 20, while the second coating bath tank 44 contains a liquid batch of the second, relatively adhesive asphaltic layer 22. The contents of the first coating bath tank are maintained at a temperature of about 300–400° F. (about 149–204° C.) to maintain the non-adhesive asphaltic material in a liquid state. Likewise, the contents of the second coating bath tank are maintained at a temperature of about 250–300° F. (about 121–149° C.) to maintain the adhesive asphaltic material in a liquid state. Each bath tank typically holds about 25 gallons (about 95 liters) of material. Each bath tank further includes a heated, revolving drum 46, 48 for applying the contents of the bath tanks to the web. Each drum is typically about 12 inches (about 30.5 cm) in diameter, and is heated to about 400° F. (about 204° C.). The drums 46, 48 are preferably rolled in a direction such that their upper surface moves with the direction of web movement to facilitate deposition of the bath tank contents 20, 22 onto the web.

The first coating bath tank 42 includes a flat scraper bar 50 positioned downstream of the point where the relatively non-adhesive asphaltic material 20 is applied to the web. The scraper bar 50 has a flat surface that is positioned on the lower surface of the web. The scraper bar 50 has a sharp edge that serves several functions. First, the sharp edge acts to scrape off as much excess material 20 from the web as possible. This is done because excess material has a tendency to fall into the second coating bath tank 44 and contaminate its contents. Secondly, the use of a rounded scraper has been found to increase the hydraulic pressure of the non-adhesive asphaltic material 20 as it passes between the edge of the scraper 50 and the web 40. In so doing, the relatively non-adhesive asphaltic material is caused to transfer entirely through the web 40 to its upper surface. This is undesirable because it causes discoloration of the top surface of the web and also may cause sticking in the finished membrane product. In contrast, the use of a scraper blade having a sharp edge has been found to force the coating material 20 only partially through the thickness of the web, thereby producing the desired result.

Once coated with the first relatively non-adhesive asphaltic material 20, the web 40 moves to the second coating bath tank 44. Unlike the first coating bath tank 42, the second coating bath tank 44 includes a revolving, rounded scraper bar 52 positioned downstream of the point where the relatively adhesive asphaltic material 22 is applied to the web. The rounded scraper bar 52 rotates in the direction of web movement to apply an even coating of the relatively adhesive asphaltic material 22 to the lower surface of the previously-applied relatively non-adhesive asphaltic material 20. The rounded scraper bar 52 is positioned on the lower surface of the web. The radius of the scraper bar 52 determines the thickness of the relatively adhesive asphaltic material 22 being applied. A scraper bar having a radius of about 1.25 inches (about 3.175 cm) is preferred. The forward rotation of the bar (i.e., rotation in the direction of the web movement) clears the bar of any solids that may cause streaking in the deposited layer 22. Additionally, the use of a rounded bar prevents relatively non-adhesive asphaltic material 20 from being removed from the web. Once the material 22 contained in the second coating bath tank 44 is applied to the web surface, the web comprises a fibrous mat having a double asphaltic layer of the type described above deposited on its lower surface. Once provided with a release layer to simplify shipping and storage, this material may be used as a roofing membrane, or it may be subjected to further processing.

As noted above, in some circumstances, such as when the fibrous mat comprises a fiberglass material, it may be desirable to provide the mat with a polymeric coating. In that embodiment, once the material has been provided with the coating from the second coating bath tank 44, the web is turned over and a polymeric coating, such as polyethylene is applied to the uncoated surface of the web. polyethylene is applied to the web at a temperature of about 350° F. (about 177° C.) at which point it quickly cools into a solid. The advantages of providing a polymeric coating on the web surface have been described previously.

Figure 4:
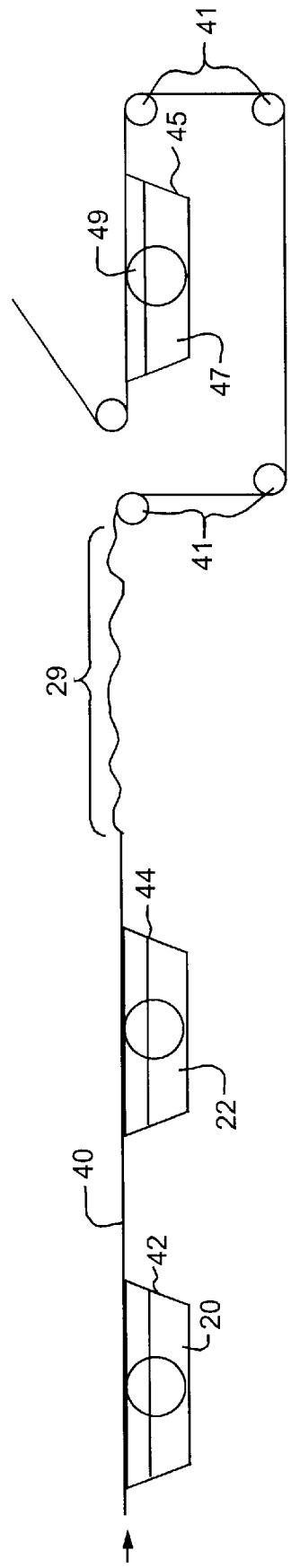
FIG. 4 is a schematic representation of one process for providing a fibrous web with a top surface coating after application of a double layer asphaltic coating.

A schematic of the polymeric coating process is depicted in FIG. 4. Specifically, once the fiberglass web 40 has passed over bath tanks 42 and 44 to coat it with the first, relatively non-adhesive asphaltic material 20 and the second, relatively adhesive material 22, respectively, it passes into a region 29 in which the web 40 is allowed to cool, and a release sheet (not shown) is applied. The web then travels through a series of inversion rollers 41 which serve to invert the web 40 in the region of a third bath tank 45 containing the polymeric coating 47. As the web 40 passes over the third bath tank 45, it contacts a drum 49 which applies the polymeric material to the surface of the web which had formerly been the top surface, (i.e., the surface which did not have the asphaltic material applied to it. The resulting web comprises a fibrous material having asphaltic material and a release sheet adjacent to one surface and a polymeric material adjacent to a second surface.

In applications in which more than one course of the membrane is applied to the roof deck, an asphaltic lap line may be required along the top edge of the membrane. The lap line is required when using a fibrous mat that is not coated such as with the polyethylene described above. Thus, for example, a polyethylene-coated fiberglass mat does not require the lap line, whereas most non-coated fibrous polyester mats do require the lap line, except in certain designs. If employed, the lap must be watertight and have some degree of structural integrity. The lap is provided because the porous nature of the fibrous mat makes it extremely difficult, if not impossible to provide a watertight seam for overlapping membrane layers. In order to overcome this problem, a narrow (i.e., about 1 inch) stripe of the relatively non-adhesive asphaltic material 20 is applied along an upper edge of the membrane. As will be described below, the material 20 is applied in a manner that provides a stripe of material along a side on the upper surface of the fibrous mat and also seals the edge of the mat adjacent to the side upon which the material 20 is applied. The resulting membrane is shown in FIG. 5.

Figure 5:
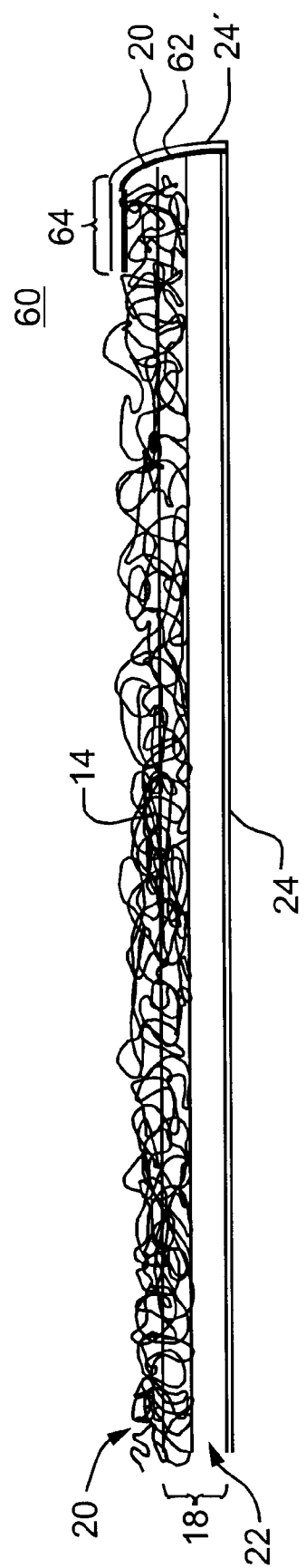
FIG. 5 is a sectional view of an embodiment of roofing material for use in an overlapping application.

In FIG. 5, the membrane 60 is similar to that of FIG. 2 with the exception that it further includes a portion of asphaltic material 20 on the upper surface and edge of the fibrous mat. Each of the materials for the fibrous mat 12, the first relatively non-adhesive asphaltic material 20, the relatively adhesive asphaltic material 22 and the release sheet 24 is as described previously. The membrane of FIG. 5 differs from that of FIG. 2 in that it further includes a portion of the relatively non-adhesive asphaltic material 20 which extends along one edge 62 of the fibrous mat 12 and onto an upper surface region 64 of the mat 12. The relatively non-adhesive material 20 is preferred over the adhesive material 22 in order to minimize sticking problems that may develop during shipping and storage of the membrane. In order to further prevent sticking, two methods can be employed. In the first method, the release sheet extend beyond the edge and is wrapped over onto the top of the membrane as shown in FIG. 5. In the second method, the portion of the material 22 which covers the edge and upper surface of the web may be provided with a parting agent such as sand, talc or a soap solution. In either case, by providing a nonporous surface of asphaltic material 20 on the edge and upper portion of the fibrous mat 12, it is possible to lap additional courses of the membranes, while maintaining a watertight seal.

Figure 6:
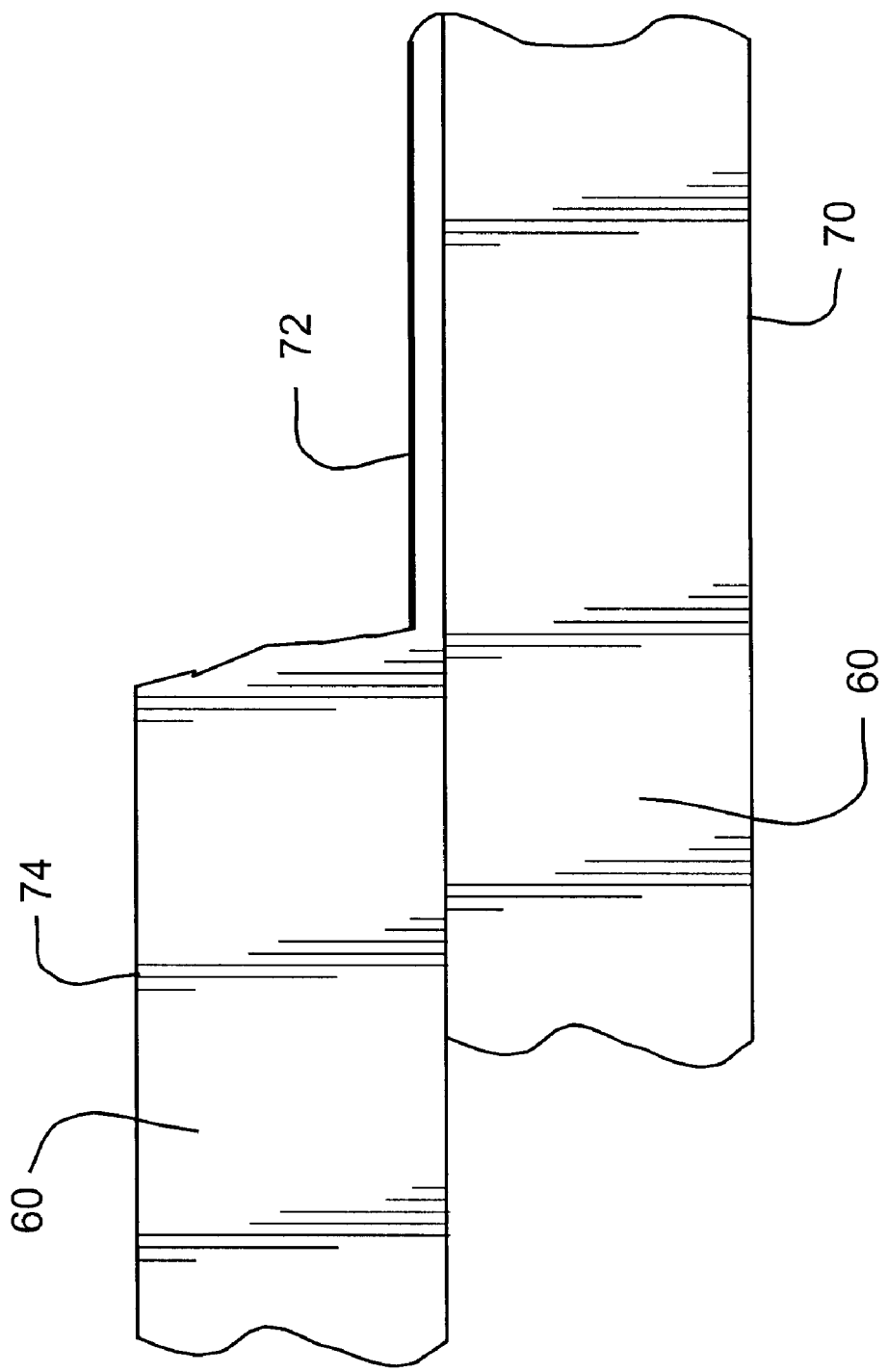
FIG. 6 is a schematic top view of two overlapping courses of roofing membrane.

Two courses of the membrane 60 are shown schematically from above in FIG. 6, where the first course 70 includes a self sealing lap line 72 of the relatively non-adhesive asphaltic material 20. The second course 74 overlaps the first course 70 along its length with an overlap approximating that of the lap line 72, i.e., about one inch.

Figure 7:
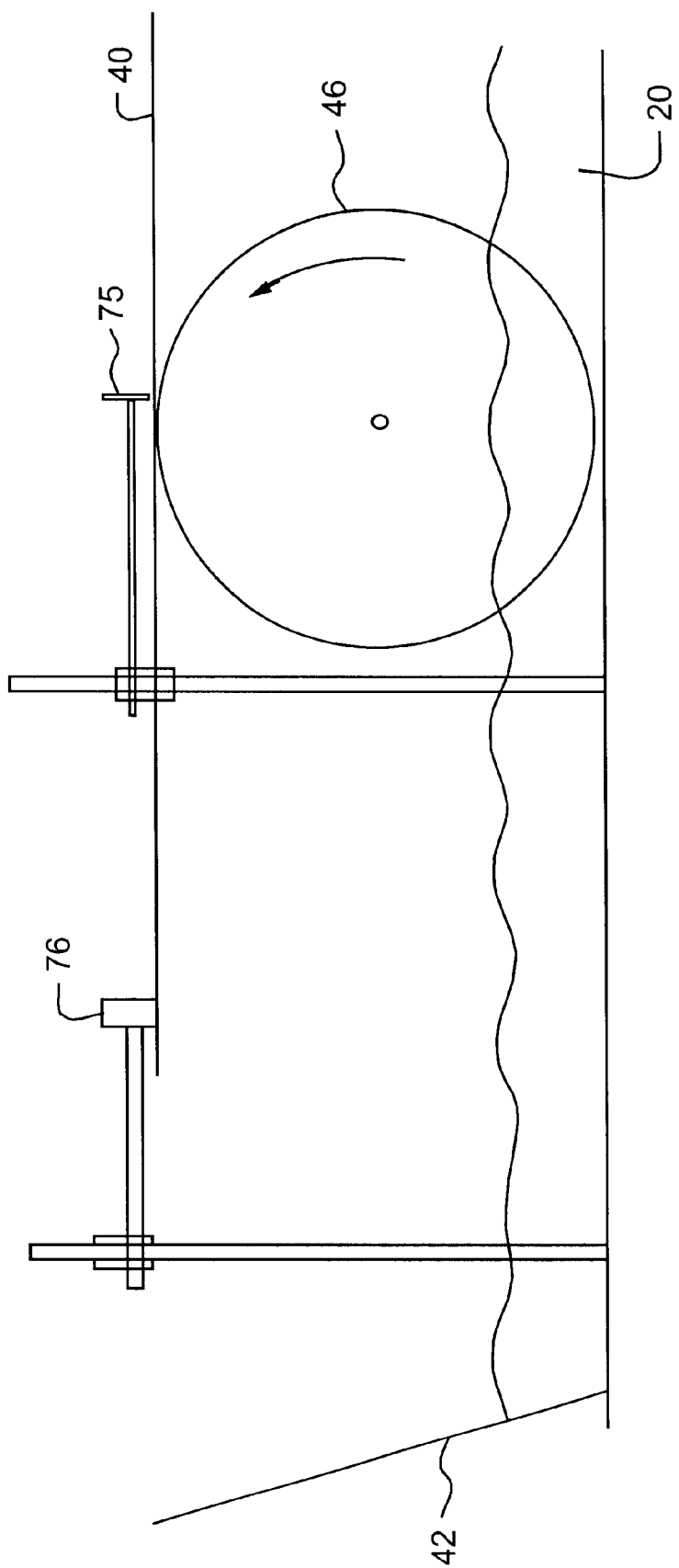
FIG. 7 is a schematic representation of one process for forming an edge seal on a roofing membrane.
Figure 8:
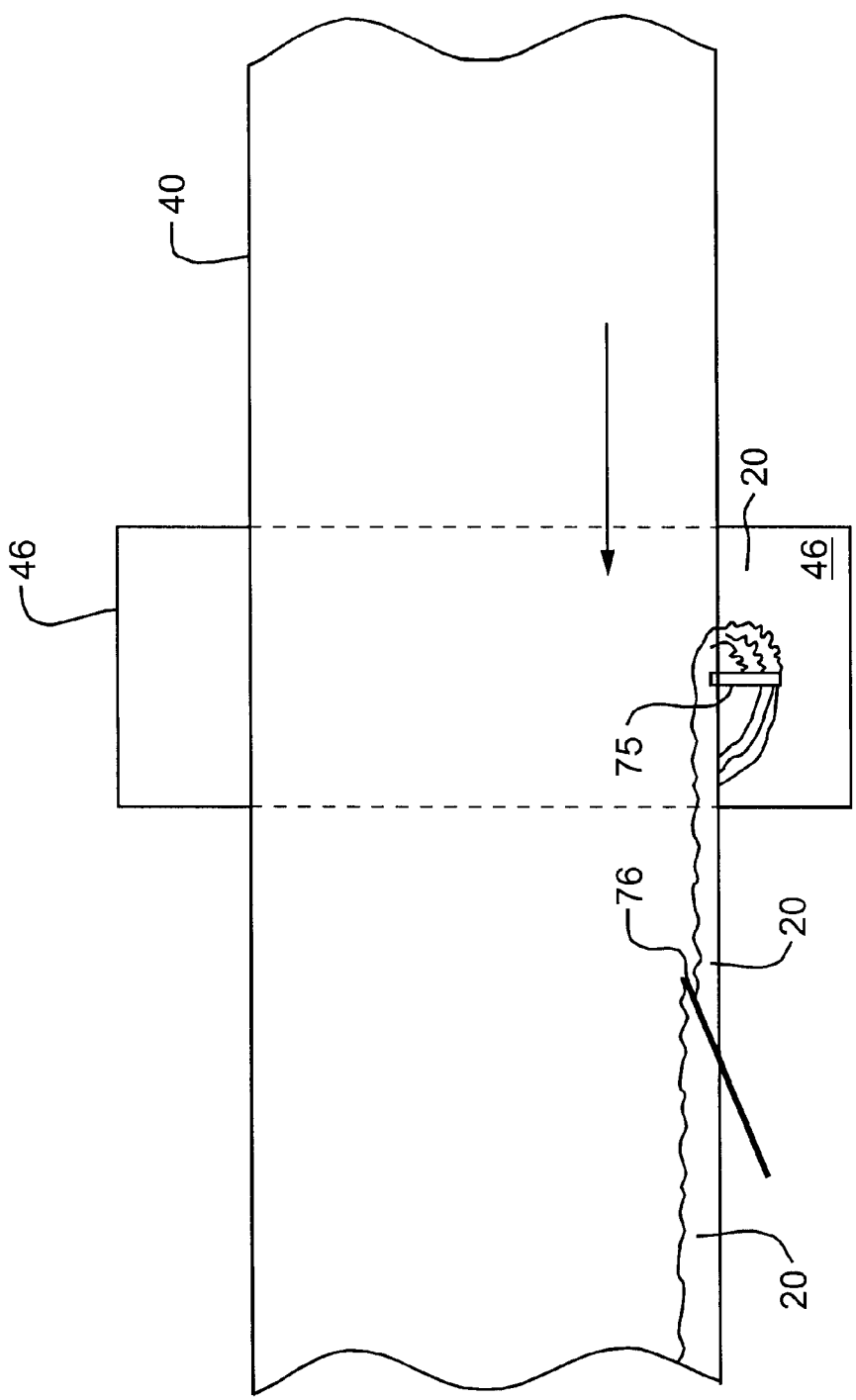
FIG. 8 is a schematic top view of the process of FIG. 7.

One method for forming the edge seal on the membrane is shown schematically in FIGS. 7 and 8. In FIGS. 7 and 8, the apparatus associated with the first coating bath tank has been modified from that shown previously. Specifically, the applicator drum 46 is of a width greater than that of the web 12 and a perpendicular "plow" blade 75 is provided adjacent to the edge of the web onto which the asphaltic material 20 is to be applied. This plow blade 75 picks up material from the applicator drum 46 and deposits it on the edge and upper surface of the web. Downstream of the plow blade 75 is an angled scraper blade 76 which wipes off excess uniformly spreads the asphaltic material 20 on the upper surface of the web 12, while simultaneously removing excess material. The action of the plow blade 75 and scraper blade 76 serves to provide a uniform, even coating of material 20 on the edge and an upper portion of the web. Sealing the edge is critical in this application because the fibrous nature of the web prevents the lap line from becoming waterproof unless the edge is sealed. This method of applying the lap line ensures edge integrity.

It is noted that if a polyester mat is used to make an article of the type described above, the laps can be made watertight without using an asphaltic lap line on the top surface of the mat if a certain type of mat is used. Specifically, polyester mats are generally manufactured in three ways. The polyester fibers can be bound together with a binder, or the fibers can be coated with nylon and then bound together using heat, or the fibers or layers of tissue-like fibers can be bound together using hot needles or heated embossing patterns. Although mats made with binder or nylon coating have been found to leak in the ASTM lap sealing test, heat bonded polyester mats made without binders do not leak.

Figure 9:
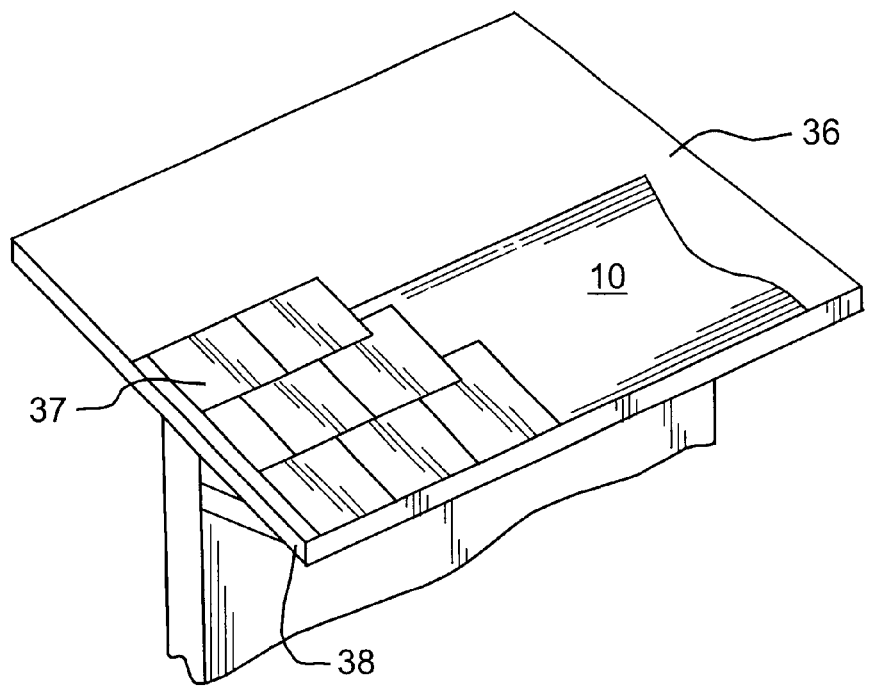
FIG. 9 is a perspective view of the eaves of a roof having the membrane of the present invention, and several shingles, applied thereto.
Figure 10:
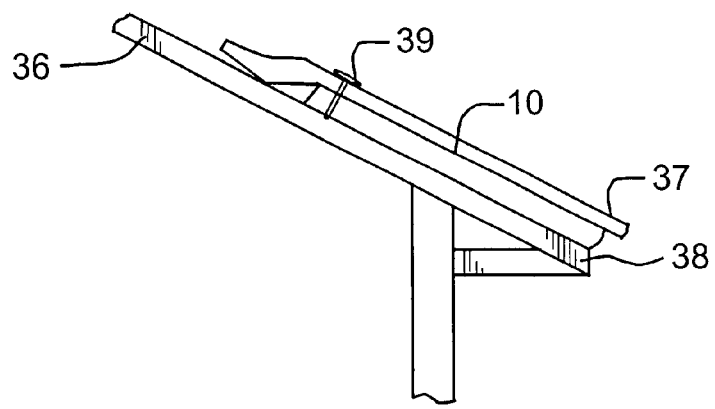
FIG. 10 is a side elevational view of the portion of the roof shown in FIG. 9, with the shingles removed for the purpose of clarity.

FIGS. 9 and 10 show the manner in which the membrane material 10 is intended for use on a roof deck 36 in the region of the roof eaves 38. In applying the present invention, eaves flashing is replaced by the membrane 10 described herein. In use, the release sheet 24 is removed from the lower surface of the double asphaltic layer 18, and the membrane 10 is secured to the roof deck 36 by adhesive action. The membrane 10 is positioned along the leading edge of the roof. Subsequently, a first row of shingles 37 is positioned in an overlying relationship to the membrane 10. The shingles are secured in place using nails 39. Although the roofing installer will often be caused to stand on the membrane during installation of the shingles, the fibrous mat of the inventive membrane 10 provides sufficient friction to minimize the likelihood of slipping. Thus, as compared to many of the known roofing membranes, the membranes of the present invention provide a safer work surface.

EQUIVALENTS

From the foregoing detailed description of the specific embodiments of the invention, it should be apparent that a unique roofing membrane material has been described. Although particular embodiments have been disclosed herein in detail, this has been done by way of example for purposes of illustration only, and is not intended to be limiting with respect to the scope of the appended claims which follow. In particular, it is contemplated by the inventor that various substitutions, alterations, and modifications may be made to the invention without departing from the spirit and scope of the invention as defined by the claims.

What is claimed is:

1. A rooting membrane material which comprises:
   a) a fibrous mat having an upper surface and a lower surface; and
   b) an adhesive asphalt coating comprising a double-layer asphaltic coating comprising:
      i) a relatively non-adhesive asphaltic material layer deposited on the lower surface of the fibrous mat in a manner such that it partially infiltrates into but not completely through the fibrous mat, and
      ii) a relatively adhesive asphaltic material layer adhered to an exposed surface of the relatively non-adhesive asphaltic material layer,
   wherein the relatively non-adhesive asphaltic material layer does not extend through the fibrous mat to the upper surface thereof.

2. The roofing membrane material of claim 1 wherein the fibrous mat comprises fibers selected from the group consisting of polyesters, polypropylenes and fiberglass.

3. The roofing membrane material of claim 1 wherein the fibrous mat further includes a polymeric coating on at least a portion thereof.

4. The roofing membrane material of claim 3 wherein the polymeric coating is selected from the group consisting of ethylene vinyl acetate, polyurethanes, polyethylenes, latex, acrylic polymers and polyesters.

5. The roofing membrane material of claim 1 which further includes a release sheet adhered to the adhesive asphalt coating.

6. The roofing membrane material of claim 1 wherein the relatively non-adhesive asphaltic material layer comprises, in combination:
   a) an oxidized asphalt; and
   b) a filler material.

7. The roofing membrane material of claim 6 wherein the filler material comprises limestone filler.

8. The roofing membrane material of claim 1 wherein the relatively adhesive asphaltic material layer comprises, in combination:
   a) a flux asphalt;
   b) a filler material;
   c) a material selected from the group consisting of styrene-butadiene copolymers and styrene-butadiene-styrene copolymers; and
   d) a tackifying oil.

9. The roofing membrane material of claim 8 wherein the filler material comprises limestone filler.

10. The roofing membrane material of claim 1 wherein the adhesive asphaltic coating extends along an edge of the fibrous mat and onto a portion of the upper surface of the fibrous mat.

11. The roofing membrane material of claim 1 wherein one layer of the double-layer asphaltic coating extends along an edge of the fibrous mat and onto a portion of the upper surface of the fibrous mat.

12. The roofing membrane material of claim 11 wherein a portion of the relatively non-adhesive asphaltic material layer extends along an edge of the fibrous mat and onto a portion of the upper surface of the fibrous mat.

13. The roofing membrane material of claim 10 which further includes a release sheet adhered to the adhesive asphalt coating, the release sheet further extending along the edge of the fibrous mat and onto the portion of the coating which is located on the portion of the upper surface of the fibrous mat.

14. The roofing membrane material of claim 12 which further includes a release sheet adhered to the relatively adhesive asphaltic material layer, the release sheet further extending along the edge of the fibrous mat and onto the portion of the relatively non-adhesive asphaltic material layer which is located on the portion of the upper surface of the fibrous mat.

15. A roofing membrane material which comprises:
   a) a fibrous mat having an upper surface and a lower surface, the mat comprising a non-woven fiberglass having an ethylene vinyl acetate coating thereon; and
   b) a double-layer asphaltic coating adhered to the lower surface of the mat, the double layer coating comprising
      i) a relatively non-adhesive asphaltic material layer comprising an oxidized asphalt and a filler material; and
      ii) a relatively adhesive asphaltic material layer adhered to the relatively non-adhesive asphaltic material layer, the relatively adhesive asphaltic material layer comprising a flux asphalt, a filler material, a material selected from the group consisting of styrene-butadiene copolymers and styrene-butadiene-styrene copolymers, and a tackifying oil,
   wherein the relatively non-adhesive asphaltic material layer is deposited on the lower surface of the fibrous mat in a manner such that it infiltrates into the mat, but does not extend therethrough to the upper surface of the mat.

16. A roofing membrane material which comprises:
   a) a fibrous mat having an upper surface and a lower surface, the mat comprising a non-woven polyester; and
   b) a double-layer asphaltic coating adhered to the lower surface of the mat, the double layer coating comprising
      i) a relatively non-adhesive asphaltic material layer comprising an oxidized asphalt and a filler material; and ii) a relatively adhesive asphaltic material layer adhered to the relatively non-adhesive asphaltic material layer, the relatively adhesive asphaltic material layer comprising a flux asphalt, a filler material, a material selected from the group consisting of styrene-butadiene copolymers and styrene-butadiene-styrene copolymers, and a tackifying oil, wherein the relatively non-adhesive asphaltic material layer is deposited on the lower surface of the fibrous mat in a manner such that it infiltrates into the mat, but does not extend therethrough to the upper surface of the mat.

* * * * *